B. SIML.
DENTAL AMALGAM OR ALLOY MIXER.
APPLICATION FILED JULY 23, 1921.

1,395,235.

Patented Oct. 25, 1921.

Witness
Arthur C. Wright

Inventor
Bohuslav Siml
By Chas. Tillman
Attorney

UNITED STATES PATENT OFFICE.

BOHUSLAV SIML, OF CHICAGO, ILLINOIS.

DENTAL AMALGAM OR ALLOY MIXER.

1,395,235.  Specification of Letters Patent.  Patented Oct. 25, 1921.

Application filed July 23, 1921. Serial No. 487,050.

*To all whom it may concern:*

Be it known that I, BOHUSLAV SIML, a citizen of the United States, residing at Chicago, in the county of Cook and State of Illinois, have invented certain new and useful Improvements in Dental Amalgam or Alloy Mixers, of which the following is the specification.

This invention relates to improvements in agitating or mixing devices, and particularly to that type of such devices which are intended for use by dentists in connection with the chucks of dental lathes or other suitable rotatable shafts or spindles for thoroughly, quickly and efficiently mixing the ingredients of dental amalgam or alloy.

The principal object of the invention is to furnish a mixer for the ingredients of amalgam, alloy and the like which shall be extremely simple and inexpensive in construction, attractive in appearance, strong, durable and efficient in operation, with its parts so made and arranged that it can be easily handled and quickly applied to or removed from the chuck of the lathe, or other suitable rotatable member employed for imparting motion to the parts of the device.

In the accompanying drawing which serves to illustrate an embodiment of the invention—

Like numerals of reference designate corresponding parts throughout the different views of the drawing.

Figure 3:
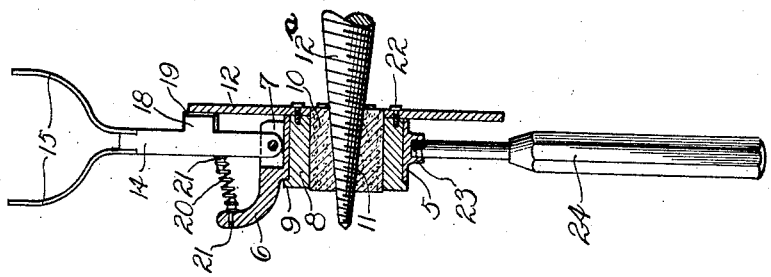
Fig. 3 is a vertical sectional view taken on line 3.3 of Fig. 1, looking in the direction indicated by arrows and illustrating the device in operative position on a portion of the chuck of a dental lathe.

The reference numeral 5 designates the frame of the device, which frame is cylindrical in shape and has on its outer surface a laterally and radially extended arm 6, which is provided in its base with a slot 7 which is located lengthwise with respect to the frame. Rotatably mounted in the frame is a body 8 of metal, which body is cylindrical in shape and of sufficient size to fit snugly yet rotatively in the frame. This body has at one of its ends an external annular flange 9 to co-act with the adjacent end of the frame.

Fitted in the opening of the body 8 so as to rotate therewith is a filler 10 which has a centrally disposed and preferably tapered opening 11 for the reception of a correspondingly shaped chuck $12^a$, or other rotatable shaft or spindle. The filler 10 is by preference made of felt but any suitable material may be substituted therefor.

Figure 2:
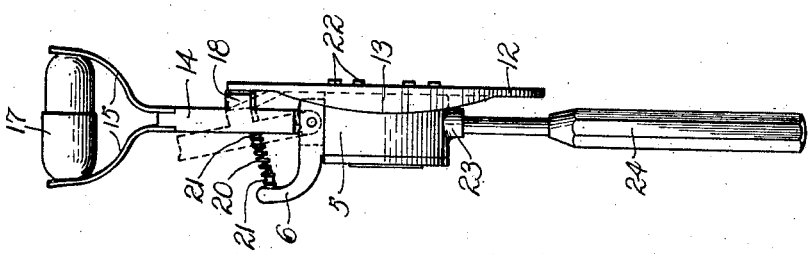
Fig. 2 is an edge view thereof.
Figure 1:
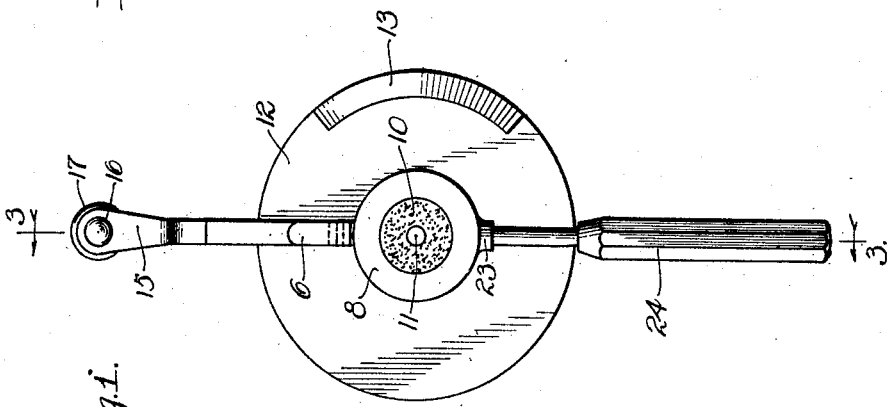
Figure 1 is a face view in elevation of one side of the mixer.

Secured to that end of the body 8 opposite the flange 9 thereon is a centrally orificed disk 12 which has at its periphery on the face thereof adjacent the body 8 a segmental cam-block 13 which is tapered toward each of its ends as is clearly shown in Fig. 2 of the drawing. Pivotally secured at one of its ends to the arm 6 and within the slot 7 thereof is a lever 14, the other end of which is provided with a pair of outwardly curved resilient clamping members 15, each of which is by preference provided near its free end with a circular opening 16 for the reception of the ends of the container for the ingredients of the amalgam or alloy, which container is by preference in the form of a capsule 17 ordinarily used for holding or administering medicines of various kinds. The lever 14 has outwardly of its pivot an extension 18, the outer surface of which is slightly rounded as at 19 to more efficiently co-act with the cam-block 13 on the disk 12 of the device.

A spring 20 of the compression type is interposed between the outer end of the arm 6 and the lever 14 as will be readily understood by reference to Figs. 2 and 3 of the drawings. The ends of the spring 20 may be supported or held in place on the arm 6 and the lever 14 by means of inwardly extended pins 21, mounted on the adjacent surfaces of said members. The disk 12 is by preference secured to the body 8 by means of a series of screws 22, inserted through suitable openings in the disk and seated in suitable openings in the adjacent end of the body.

The frame 5 is provided on its outer surface diametrically opposite the arm 6 with a screw-threaded socket 23 for the reception of one end of the handle 24, which is employed for manually handling or manipulating the mixer.

By grasping the handle 24 with one hand it is manifest that the filler 10 can be securely fitted on the tapered chuck 12 so that in the rotation of said chuck the filler 10, the body 8 and the disk 12 will be rapidly rotated, in which operation the cam-block 13 will be caused to intermittently impinge the extension 18 on the lever 14 thus causing it to vibrate rapidly and laterally with respect to the disk, thereby agitating the ingredients contained in the receptacle or capsule 17 and thus thoroughly mixing the same.

Having thus fully described my invention, what I claim as new and desire to secure by Letters-Patent is:—

1. The combination with a cylindrical frame having a laterally and radially extended arm provided with a slot disposed longitudinally with respect to said frame, of a cylindrical body rotatably mounted in said frame and having at one of its ends an external annular flange to co-act with the adjacent end of the frame, a centrally orificed filling located in the body for rotation therewith, a disk having a central opening surrounding a portion of said filling and secured to that end of the body opposite its flange, a segmental cam-block on the face of the disk adjacent the body and a spring pressed lever pivoted at one of its ends in the slot of the said arm and having at its other end spaced resilient clamping members for a container.

2. The combination with a cylindrical frame having a laterally and radially extended arm provided with a slot disposed longitudinally with respect to said frame, of a centrally orificed cylindrical body rotatably mounted in said frame and having at one of its ends an external annular flange to co-act with the adjacent end of the frame, a disk having a central opening and secured to that end of the body opposite its flange, a segmental cam block on the face of the disk adjacent the body, a lever pivoted at one of its ends in the slot of said arm for movement in a plane with the arm and having a projection extended into the path of said cam block, a pair of spaced resilient clamping members mounted on the free end of said lever, and a spring interposed between said arm and the lever.

BOHUSLAV SIML.